United States Patent Office 2,891,997
Patented June 23, 1959

2,891,997

METHOD OF PREPARING BORON TRIALKYL

Samuel Witz, West Covina, Calif., assignor to Aerojet-General Corporation, Azusa, Calif., a corporation of Ohio No Drawing. Application April 25, 1955
Serial No. 503,810

13 Claims. (Cl. 260—606.5)

This invention relates to a method for preparing boron trialkyl.

Boron trialkyl readily reacts with hydrogen in an electrodeless discharge tube to produce alkylated diboranes such as tetra-alkyl diborane, as disclosed in assignee's copending application Serial No. 470,240, filed November 22, 1954. Boron trialkyl also reacts with diborane to form tetra-alkyl diborane. When added to hydrocarbon fuels such as gasoline in amounts corresponding to about 1% by weight, the normally liquid tetra-alkyl diboranes have been found to dramatically improve the combustion characteristics of such fuels in internal combustion engines. Due to the difficulty of economically obtaining adequate quantities of boron trialkyl, the commercial use of tetra-alkyl diborane has been seriously limited.

Heretofore, boron trialkyl has been prepared by reacting boron esters or halides with a metal alkyl or Grignard reagent in ether solutions. The synthesis employing the Grignard reagent is not adaptable to flow techniques and is therefore commercially impractical. The synthesis employing metal alkyls is limited by the expense and generally hazardous nature of the metal alkyls. Boron trialkyl has also been prepared by passing boron halide and an alkyl halide over a metal at high temperatures. However, this method produces boron trialkyl in poor yield.

I have now found that boron trialkyl is readily obtained by reacting magnesium boride with an alkyl halide. The reaction can be conducted either in a static system or a flow system and is readily adapted to large scale commercial production. It employs neither expensive nor hazardous starting materials and the products are readily recovered.

The reaction is generally conducted by heating the metal boride in an atmosphere of the alkyl halide. The reaction proceeds smoothly and rapidly at temperatures between about 225° C. and about 425° C. As a matter of commercial availability and convenience, alkyl chlorides are ordinarily employed.

The following examples are presented to more fully illustrate this invention. It is to be understood, however, that these examples are presented merely as a means of illustration and are not intended to limit the scope of the invention in any way.

EXAMPLE I

*Preparation of trimethylboron by means of a flow technique*

Methyl chloride was passed over magnesium boride (20 to 42 mesh) heated to 420° C. at the rate of 19.2 cc./min. (70° F. and 1 atm.) calculated residence time, 13.3 sec. A 44% conversion of the methyl chloride was achieved with an 8.9% yield of trimethylboron. A duplicate run using a flow rate of 27 cc./min. (residence time 9.5 sec.) yielded 11% trimethylboron with a 10% conversion of the methyl chloride, at 420° C.

EXAMPLE II

*Preparation of trimethylboron in a static system*

Magnesium boride was heated in an atmosphere of methyl chloride (initial pressure=127 mm. at 26° C.) at a temperature of 412–418° C. for approximately one-half hour. The non-condensable products found in the reaction were pumped off at −196° C. (liquid nitrogen). An infrared analysis of the condensable fraction indicated a 74% conversion of the methyl chloride and a 16% yield of trimethylboron based upon the conversion value.

EXAMPLE III

*Preparation of trimethylboron in a static system*

Magnesium boride was heated in an atmosphere of methyl iodide at a temperature of 385–405° C. for approximately 1½ hours. The methyl iodide underwent a 78% conversion producing trimethylboron in 15% yield.

In accordance with the invention, methyl bromide reacts with magnesium boride to produce boron trimethyl and propyl chloride reacts with magnesium boride to produce boron tripropyl.

Any lower alkyl halide can be used in the practice of this invention. These include methyl, ethyl, propyl, butyl, etc., chlorides, bromides and iodides. Mixtures of these compounds can also be used so as to produce mixed compounds such as boron dimethylethyl, boron methylethylpropyl, etc.

The preferred temperature range is from about 225° C. to about 425° C. Lower as well as higher temperatures can be used, however, the reaction proceeds very slowly at lower temperatures while at higher temperatures degradation and the formation of undesirable products is likely to occur.

Residence time or the duration of the reaction can be varied over wide ranges. The reaction of course proceeds farther toward completion with longer times, hence it is not desirable to use extremely short residence times. At the same time, it is usually not desirable to use long periods of residence time since little is gained and side reactions may occur.

The novel reaction of this invention lends itself to a continuous process. For example, methyl chloride can be continuously passed over magnesium boride, the reactant gases continuously stripped of boron trimethyl product and the unreacted methylchloride recycled repeatedly. Also, methyl iodide can be continuously passed over magnesium boride, the reactant gases continuously stripped of boron trimethyl product and the unreacted methyl iodide recycled repeatedly.

I claim:

1. A method of preparing boron trialkyl which comprises reacting magnesium boride with lower alkyl halide.

2. The method of claim 1 wherein said lower alkyl halide is an alkyl chloride.

3. The method of claim 1 wherein said lower alkyl halide is an alkyl bromide.

4. The method of claim 1 wherein said lower alkyl halide is an alkyl iodide.

5. The method of claim 1 wherein the reaction is conducted at a temperature in the range of from about 225° C. to about 425° C.

6. A method of preparing boron trimethyl which comprises reacting methyl chloride with magnesium boride at a temperature in the range of from about 225° C. to about 425° C.

7. A method of preparing boron trimethyl which comprises reacting methyl iodide with magnesium boride at a temperature in the range of from about 225° C. to about 425° C.

8. A continuous method for producing boron trialkyl which comprises continuously passing lower alkyl halide over magnesium boride heated to a temperature of from about 225° C. to about 425° C.

9. The method of claim 8 wherein the reaction product is stripped of boron trialkyl and the unreacted alkyl halide recycled and again passed over said magnesium boride.

10. A continuous method for producing boron trimethyl which comprises continuously passing methyl chloride over magnesium boride heated to a temperature of about 420° C.

11. The method of claim 10 wherein the reaction product is stripped of boron trimethyl and the unreacted methyl chloride recycled and again passed over said magnesium boride.

12. A continuous method for producing boron trimethyl which comprises continuously passing methyl iodide over magnesium boride heated to a temperature of from about 385° C. to about 405° C.

13. The method of claim 12 wherein the reaction product is stripped of boron trimethyl and the unreacted methyl iodide recycled and again passed over said magnesium boride.

No references cited.